UNITED STATES PATENT OFFICE.

JUNIUS SCHENCK, OF BROOKLYN, NEW YORK.

IMPROVEMENT IN THE MANUFACTURE OF HOSE, TUBING, AND OTHER RUBBER FABRICS.

*Specification forming part of Letters Patent No. 90,397, dated May 25, 1869.*

*To all whom it may concern:*

Be it known that I, JUNIUS SCHENCK, of Brooklyn, in the county of Kings and State of New York, have invented certain new and useful Improvements in Preventing Decay in Rubber Hose, Tubing, and the Like; and I do hereby declare that the following is a full, clear, and exact description thereof.

To enable others skilled in the art to construct and use my invention, I will proceed to describe it.

It has long been known that rubber hose, after a few years' service, becomes very much weakened, especially near the joints. This has been attributed to various causes. After repeated and long-continued experiments, I have ascertained that this weakening is due to rot or decay in the fibrous materials which compose the body of the hose.

The nature of my invention, therefore, consists in applying preservative or antiseptic substances to the fibrous or textile materials which compose the body of the hose. For this purpose I prefer carbolic acid or the various analogous compounds derived from the destructive distillation of wood, coal, and like substances. I also employ various salts of copper, the preservative effect of which on vegetable fiber has been long known.

To enable others to make and use my invention, I will proceed to describe it.

I take a solution of carbolic acid, more or less pure, according to the kind of hose to be manufactured, and form a solution of about one part of the acid to one hundred and fifty parts of water. In this I immerse the duck, canvas, or other fibrous material to be used in forming the hose. When I use copper salts, such as sulphate, ammoniated copper, or other copper salts, I form a solution of about one pound of the copper salt to forty gallons of water, and apply the solution to the fabric used in the hose. By this treatment all decay and mildew in the body of the hose is prevented.

By forming the gum portion of the hose in the manner described in the patent of William A. Torrey, July 10, 1866, No. 56,292, all decay is prevented, both in the rubber and in the fibrous portion of the hose.

My invention is also applicable to the manufacture of belting, packing, and other fabrics where rubber and fibrous materials are combined. It is not necessary to apply any compound to set or fix the preservative materials.

Having thus described my invention, what I claim, and desire to secure by Letters Patent of the United States, is—

1. The application of the preservative compounds herein mentioned, or their equivalents, to hose, belting, and the like fabrics, so as to preserve the same, substantially as described.

2. The improved hose, belting, packing, and other fabrics prepared by combining the substances herein named with the fibrous material composing the same, substantially as described.

JUNIUS SCHENCK.

Witnesses:
HOWARD M. TWOMBLY,
E. J. LOOMIS.